(12) United States Patent
Lamb

(10) Patent No.: US 7,025,880 B2
(45) Date of Patent: Apr. 11, 2006

(54) FLUID RECEPTACLE AND FILTER SYSTEM

(76) Inventor: Douglas R. Lamb, 3690 County Rd. 10, Bellefontaine, OH (US) 43311

( * ) Notice: Subject to any disclaimer, the term of this patent is extended or adjusted under 35 U.S.C. 154(b) by 113 days.

(21) Appl. No.: 10/056,277

(22) Filed: Jan. 24, 2002

(65) Prior Publication Data

US 2003/0136720 A1 Jul. 24, 2003

(51) Int. Cl.
*A47L 13/58* (2006.01)
*B01D 35/02* (2006.01)

(52) U.S. Cl. ............... 210/238; 210/455; 210/473; 210/483; 248/94; 15/264; 220/729

(58) Field of Classification Search ............... 210/320, 210/450–451, 473, 463, 469, 459, 474, 476–477, 210/481, 483, 495, 498, 455–456, 467, 305–307, 210/244–245, 521, 247, 166, 164, 529, 238; 220/703–704, 710, 719, 556, 702, 554, 571.1, 220/571, 912, 573.4, 625, 729; 99/449, 450, 99/415; 248/94; D9/456; D7/667, 369; 15/264, 260; D32/53, 53.1, 54

See application file for complete search history.

(56) References Cited

U.S. PATENT DOCUMENTS

| | | | | | |
|---|---|---|---|---|---|
| 267,065 | A | * | 11/1882 | De Lime | ............... 99/277.1 |
| 765,131 | A | * | 7/1904 | Croswell | ............... 4/652 |
| 865,691 | A | * | 9/1907 | Fox | ............... 210/445 |
| 1,349,508 | A | * | 8/1920 | Harrington | ............... 99/450 |
| 2,133,805 | A | * | 10/1938 | Brown | ............... 428/309.9 |
| 2,358,750 | A | * | 9/1944 | Walker et al. | ............... 52/21 |
| 2,689,017 | A | * | 9/1954 | Schmid | ............... 210/164 |
| 2,864,504 | A | * | 12/1958 | Jepson | ............... 210/238 |
| 3,295,686 | A | * | 1/1967 | Krueger | ............... 210/455 |
| 3,662,780 | A | * | 5/1972 | Marsh | ............... 137/590 |
| 3,920,347 | A | * | 11/1975 | Sauriol et al. | ............... 404/25 |
| 4,021,354 | A | * | 5/1977 | Lyon | ............... 210/477 |
| 4,685,472 | A | * | 8/1987 | Muto | ............... 600/573 |
| 4,904,378 | A | * | 2/1990 | Arai | ............... 209/400 |
| 5,800,702 | A | * | 9/1998 | Taylor-McCune et al. | .. 210/162 |
| 5,807,481 | A | * | 9/1998 | Hodgkins et al. | ............ 210/130 |
| 6,458,303 | B1 | * | 10/2002 | Fuehrer et al. | ............. 264/153 |
| 6,808,623 | B1 | * | 10/2004 | Harris et al. | ................ 210/164 |

FOREIGN PATENT DOCUMENTS

DE 20102840 U1 * 6/2001
WO WO-99018837 * 4/1999

OTHER PUBLICATIONS

English Translation of WO 99/18837.*

* cited by examiner

*Primary Examiner*—Terry K. Cecil
(74) *Attorney, Agent, or Firm*—McNees Wallace & Nurick LLC; Courtney J. Miller, Esq.

(57) ABSTRACT

A system for separating particles from fluid which includes a receptacle for containing the fluid, a lid for covering the receptacle, and a filter assembly which includes a filter component shaped to fit the receptacle, an o-ring encircling the perimeter of the filter component for securing the filter assembly in the receptacle, and at least two baffles attached to the bottom of the filter component for reducing the motion of the fluid around and through the filter assembly.

11 Claims, 3 Drawing Sheets

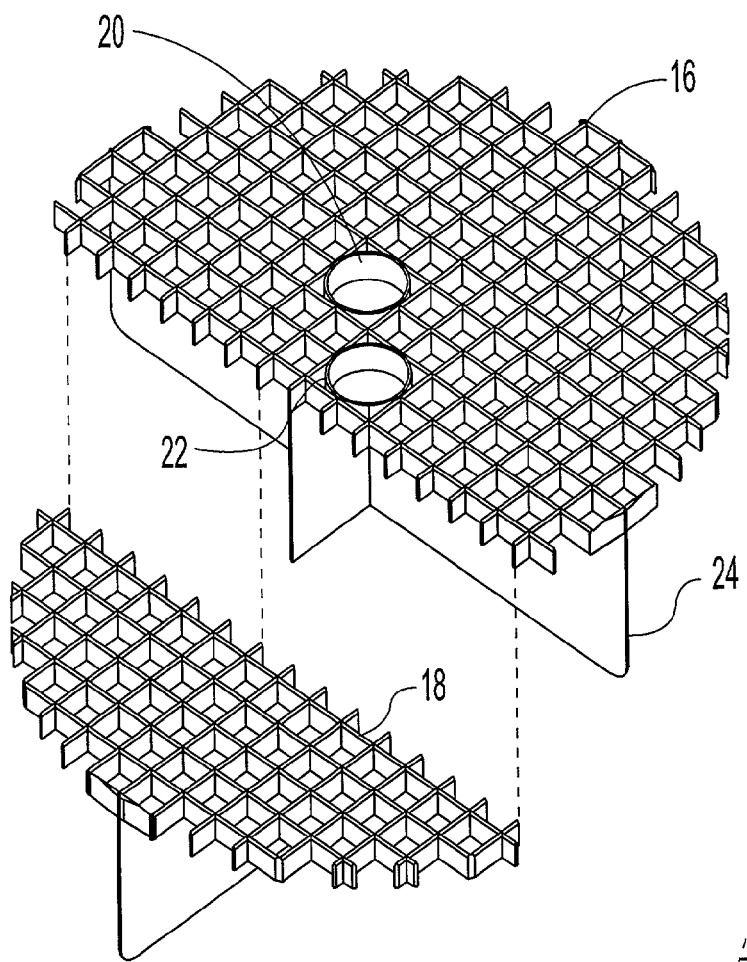
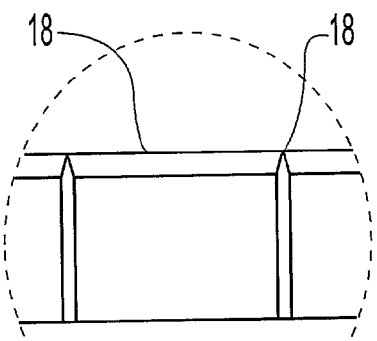
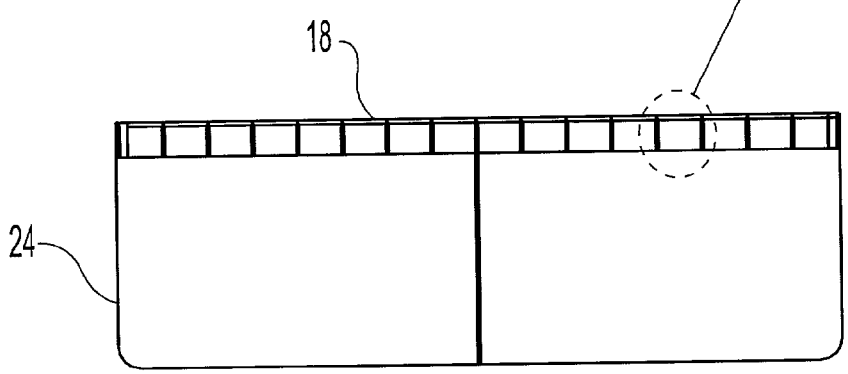
*Fig. 3A*
*Fig. 3B*

FLUID RECEPTACLE AND FILTER SYSTEM

TECHNICAL FIELD

This invention relates generally to filter systems that are useful for separating relatively heavy particles of debris that are suspended in solution from the solution itself, and specifically to a filtration system for separating relatively heavy particles of debris from dirty wash water contained in a receptacle such as a bucket.

BACKGROUND OF THE INVENTION

Despite the availability of modern paints and clear coating, the finish of many vehicles such as boats, automobiles, and motorcycles is still susceptible to scratches and abrasions. One source of such scratches and abrasions can be the dirt and debris that often accumulates on the rags or mitts used to wash the exterior of these vehicles. When a dirty wash rag or mitt is placed in a bucket of soapy water for rinsing, the grit and debris that has been picked up from the surface of the car or boat is transferred into the wash water. As the water becomes dirtier, the rag or mitt may actually pick up the grit or debris that has become suspended in the wash water or that has accumulated at the bottom of the bucket. Thus, the wash rag or mitt is not effectively rinsed clean, and the grit and debris that is picked up by the rag from the dirty water is likely to be transferred back onto the exterior of the car, boat, or motorcycle where it can do significant damage to the vehicle's finish.

Given this potential damage to the exterior finish of a vehicle, there is a need for an inexpensive and effective system for separating grit and debris from the water or other fluid that is used to wash vehicles or other items with surfaces that are susceptible to scratches and abrasions.

SUMMARY OF THE INVENTION

This invention provides a system for separating particles of dirt, gravel, grit, and other potentially damaging debris from a wash fluid such as water when such fluid is contained in a receptacle such as a bucket. While the filter assembly of the present invention may be used with a variety of receptacles, in a preferred embodiment, the present invention includes a receptacle that has been manufactured specifically for use with the filter assembly. Preferably, the filter assembly itself is shaped such that it matches the shape of the receptacle and fits firmly within the receptacle. In a preferred embodiment, the receptacle and filter assembly is manufactured as an integrated unit, wherein the dimensions of the receptacle correspond to the dimension of the filter assembly.

The filter component of the filter assembly has an upward facing side and a downward facing side and is made from a hard mesh, screen, or any other suitable screen-like material. Preferably, the upward facing side of the filter component includes crossbars that are tapered to minimize the surface area of said filter component. These tapered crossbars may also include barbs or other similar structures on the downward facing side of the filter assembly that facilitate the retention of dirt particles below the filter assembly.

In a preferred embodiment, an o-ring or similar structure encircles the outer edge of the filter component for securing the filter assembly in the receptacle and, ideally, forming a temporary seal between the receptacle and the filter assembly. This temporary seal helps to minimize the back-flow of dirt or grit into the fluid above the filter assembly. In alternate embodiments of this invention, the o-ring is either formed of the same material as the filter component or is simply not present. At least two baffles attached to the downward facing side of the filter component reduce the motion of the wash fluid around and through the filter assembly. These baffles may include secondary baffle-like structures attached at right angles to the primary baffles for further reducing the movement of fluid below the filter assembly.

In a preferred embodiment, the filter component includes at least one aperture that passes though the filter component and provides a means by which a user of the system may easily remove the filter assembly from the receptacle. Preferably, the aperture or apertures are defined by a band or ring of material that is either separate from the material of the filter component or formed from the material of the filter component.

Further advantages of the present invention will become apparent to those of ordinary skill in the art upon reading and understanding the following detailed description of the preferred embodiments.

BRIEF DESCRIPTION OF THE DRAWINGS

FIG. 3A is a cross sectional perspective view of the filter component of the filter assembly of FIG. 2A and FIG. 2B showing the internal construction of the filter component.

FIG. 3B is a cross sectional side view of the filter component of the filter assembly of FIG. 2A and FIG. 2B showing the internal construction of the filter component, particularly, the tapered shape of the upward facing side of the cross-bars of the filter component.

DETAILED DESCRIPTION OF THE INVENTION

The present invention provides a fluid receptacle and filter assembly for separating particles of gravel, dirt, grit and other relatively heavy debris from the wash water or other fluid contained in a bucket or other receptacle. In the context of this invention, "particle" refers to any and all debris that is heavy enough to fall out of suspension in a liquid or sink to the bottom of a bucket or other receptacle due to the effect of gravity.

Figures 1A, 1B, 1C:
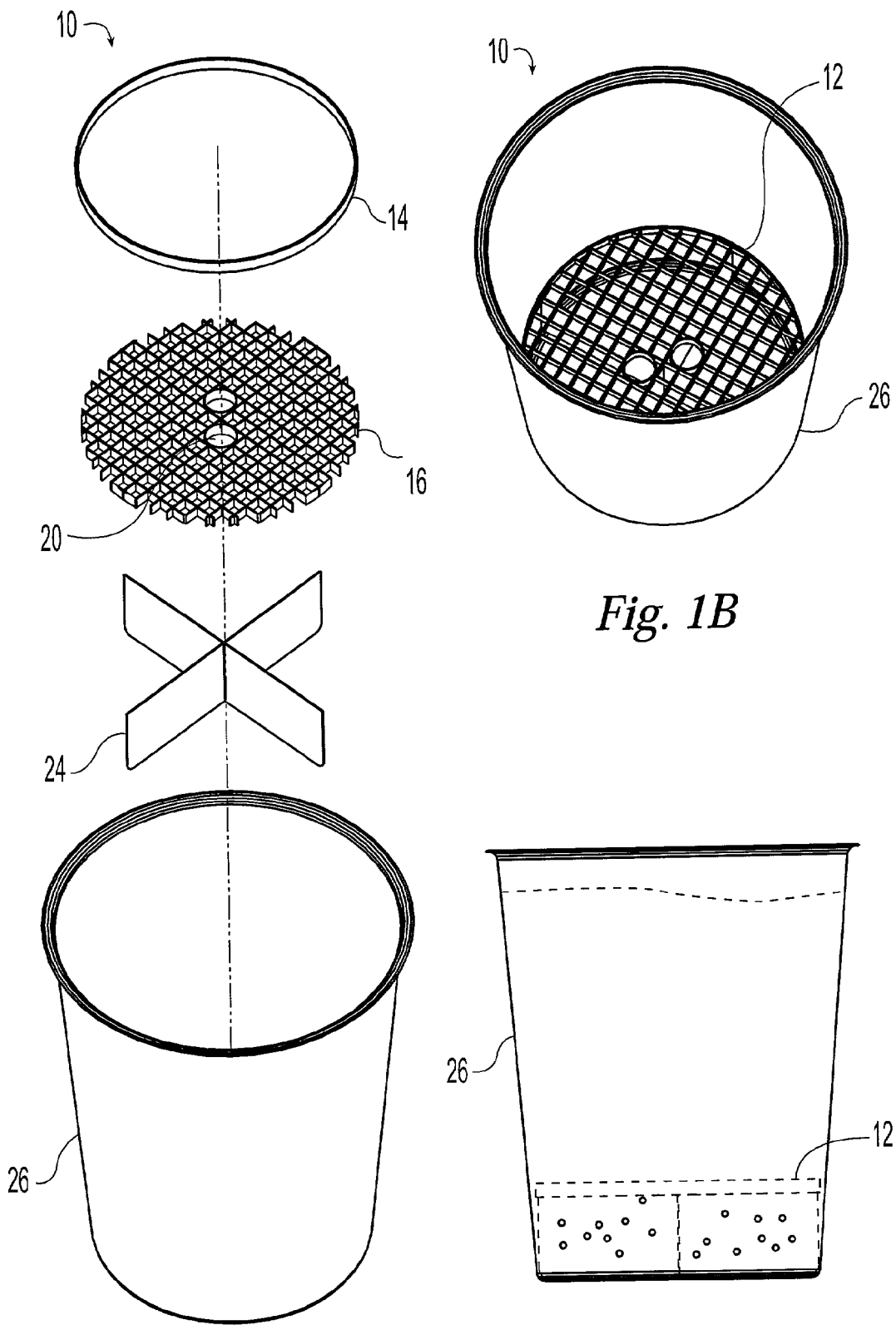
FIG. 1A is an exploded view of the fluid receptacle and filter system of the present invention.
FIG. 1B is a perspective view of the fluid receptacle and filter system of FIG. 1A showing the preferred placement of the filter assembly in the fluid receptacle.
FIG. 1C is a cross sectional view of the fluid receptacle and filter system of FIG. 1 showing the preferred placement of the filter assembly in the fluid receptacle.
Figure 2A:
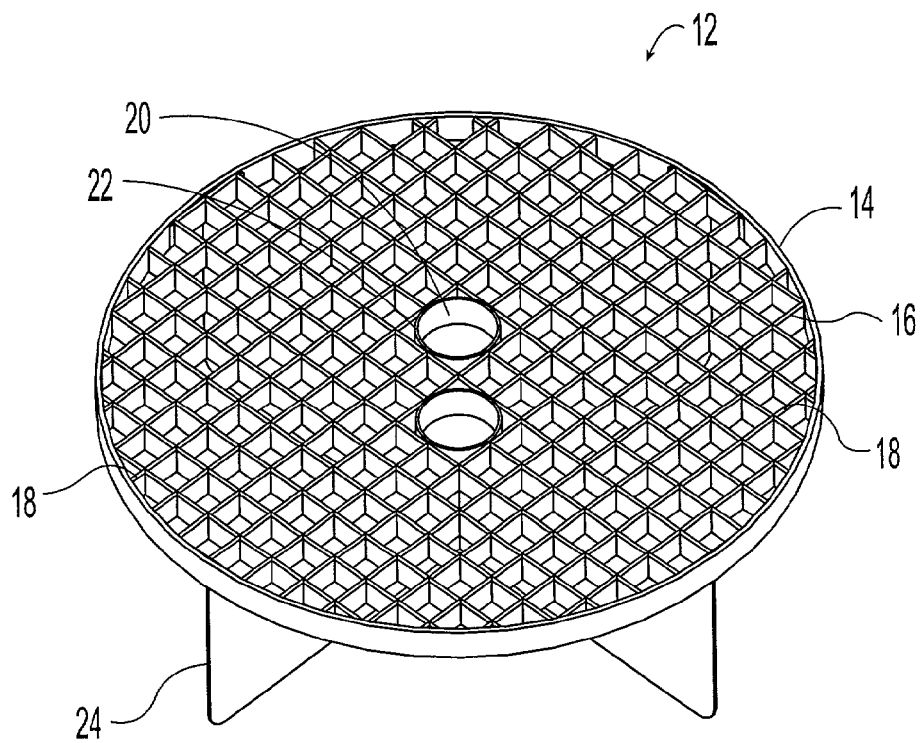
FIG. 2A is a perspective view of the top of the filter assembly.

As best shown in FIGS. 1A, 1B, and 2A, and according to a preferred embodiment, fluid receptacle and filter system 10 includes filter assembly 12, receptacle 26, and a lid for receptacle 26 (not shown). Filter assembly 12 further includes o-ring 14 and filter component 16 which further comprises crossbars 18, apertures 20, and baffles 24. In a preferred embodiment, o-ring 14 encircles filter component 16 and may be manufactured from plastic, rubber, or any other suitable material. Preferably, filter component 16 is manufactured from plastic or hard rubber and comprises a plurality of crossbars 18 that form a mesh or net. The distance between cross-bars 18 is, preferably, about 0.01 cm to 3.0 cm although greater or lesser distances may be incorporated into filter component 16 depending on the size of the particles that the user wishes to separate from the wash fluid. The thickness of filter component 16 is, preferably, about 0.1 to 3.0 cm, although greater or lesser thickness may be suitable based on the materials used to manufacture filter system 10.

In one embodiment, the spaces between crossbars 18 are shaped to form funnel-like structures to encourage dirt and debris to pass through filter component 16. In alternate embodiments, the spaces between crossbars 18 are honeycomb shaped, round, oval, or square. In other embodiments, filter component 16 is divided into a plurality of sections, each section comprising a screen wherein crossbars 18 are either oriented toward the center of filter component 16, or wherein crossbars 18 comprise a variety of different configurations. For example, one section of filter component 16 may be honeycombed, while an adjacent section may comprise square openings between the crossbars. Numerous different configurations are possible. Additionally, in an alternate embodiment, the upward-facing surface of filter component 16 includes a plurality of protrusions that facilitate the removal of grit or dirt from a wash rag or mitt.

In a preferred embodiment, a single filter assembly 12 is placed inside receptacle 26 when this invention is in use. However, in alternate embodiments, multiple filter assemblies are placed on top of one another inside receptacle 26. In still other embodiments, multiple filter assemblies are used, and each filter assembly comprises a filter component having a crossbar arrangement different from the other filter assembly or assemblies.

In a preferred embodiment, and as shown in FIG. 3B, the upward-facing surfaces of cross bars 18, are shaped or tapered into narrow ridge to minimize the surface area of the upward facing side of filter component 16 upon which dirt or debris can come to rest. In alternate embodiments, the downward-facing surfaces of crossbars 18 also include barbs or other similar structures that, in cross-section, give each crossbar 18 the appearance of an arrowhead.

Figure 2B:
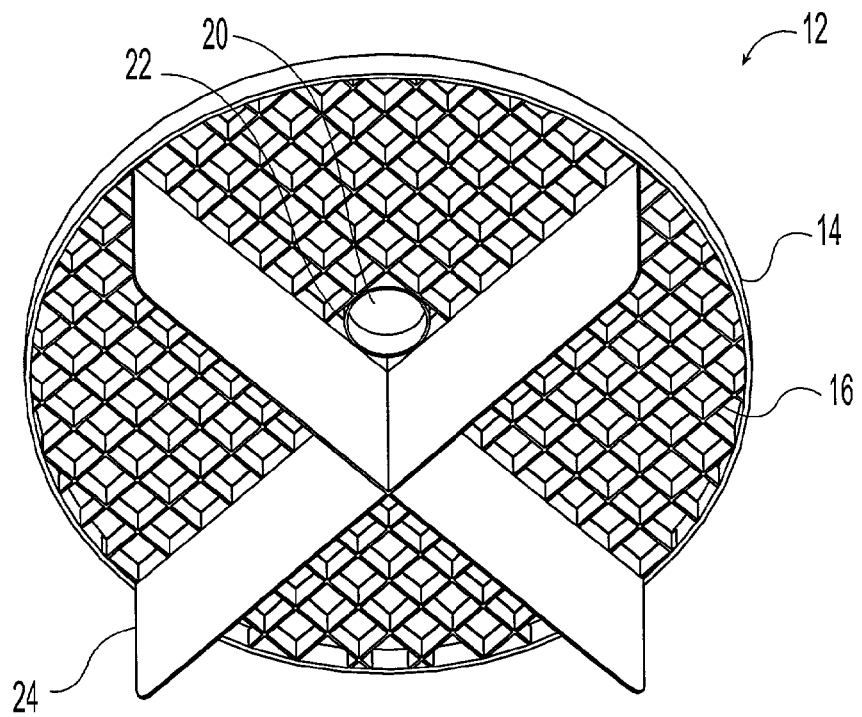
FIG. 2B is a perspective view of the bottom of the filter assembly.

As best illustrated in FIG. 2A and FIG. 2B, a preferred embodiment of filter assembly 12, further includes at least one, and preferably two, apertures 20. Alternate embodiments include additional apertures 20. Preferably, the outer edge of each aperture is defined by a ring 22 of plastic, hard rubber, or other suitable material and are designed to accommodate the thumb and one finger of a user of this invention so that filter assembly 12 may be easily removed from receptacle 26.

As shown in FIG. 2B, at least two baffles 24 are attached to, or formed as part of, the bottom of filter component 16. Preferably, these baffles are manufactured from plastic, hard rubber, or any other suitable material and are attached to the bottom or downward facing side of filter component at right angles to one another. In alternate embodiments, additional baffles are attached to the bottom of filter component 16 and are not mounted be at right angles to one another. In still another embodiment, baffles 24 include secondary baffle-like structures attached to or formed at right angles to the primary baffles for further reducing the movement of fluid below the filter assembly.

Preferably, fluid receptacle and filter system 10 is used by first filing receptacle 26 roughly two-thirds full of water or other fluid. Filter assembly 12 is then placed into receptacle 26 where it sits at the bottom of receptacle 26. Filter assembly 12 is held in place by o-ring 14 which forms a seal with the inside surface of receptacle 26. After the rag or mitt which is being used to wash a vehicle or other surface picks up grit or debris, the user of this invention places the rag or mitt into the bucket and strikes or shakes the rag or mitt against filter assembly 12. The grit and debris is loosened from the rag and becomes suspended in the wash fluid. After the rag or mitt is removed, the heavier particles pass through filter component 16 and come to rest on the bottom of receptacle 26. When filter assembly 12 is placed in receptacle, as shown in FIG. 1B and FIG. 1C, baffles 24 reduce the motion of the wash fluid in the bottom of receptacle 26, and consequently reduce the back-flow of fluid and particles into the fluid above filter assembly 12. Thus, the wash fluid above filter assembly 12 is kept relatively free of the abrasive dirt, gravel, grit, and debris that can be transferred back onto the wash rag or mitt.

Preferably, fluid receptacle and filter system 10 is manufactured as an integrated unit so that filter assembly 12 fits securely in receptacle 26. However, in alternate embodiments, filter assembly 12 is manufactured in a variety of sizes and shapes such that it may be utilized with any of a number of different buckets or other receptacles suitable for containing fluids. In one embodiment, filter assembly 12 is manufactured or cast as a single piece or unit that includes all of the features described above. In still another embodiment, filter assembly 12 and receptacle 26 are made from a single cast and form one continuous structure, i.e., filter assembly 12 is an inseparable part of receptacle 26 and cannot be removed. In still another embodiment, filter assembly 12 does not include baffles 24 because these structures are preformed in the bottom of receptacle 26. In this embodiment, filter assembly 12 includes ridges or grooves for securing the filter component to the baffles 24.

While the above description contains many specificities, these should not be construed as limitations on the scope of the invention, but rather as exemplification of preferred embodiments. Numerous other variations of the present invention are possible, and it is not intended herein to mention all of the possible equivalent forms or ramifications of this invention.

What is claimed:

1. A cleaning system, comprising:
   (a) a bucket, wherein the bucket further comprises a closed bottom portion and an open top portion; and
   (b) a removable bucket insert, wherein the bucket insert sits in the bottom portion of the bucket and further comprises:
      (i) at least one filter, wherein the filter is plate shaped and further comprises:
         a) an upward facing side and a downward facing side; and
         b) a plurality of intersecting crossbars, wherein the crossbars define a plurality of openings between the intersecting crossbars, and wherein the openings pass completely though the filter; and
      (ii) a support means elevating the filter above the bottom of the bucket and consisting of two baffles, each baffle resting on the bucket bottom portion and attached to or formed integrally with the downward facing side of the filter, the baffles substantially traversing the length and width of the filter at substantially right angles to the filter and dividing and separating the space in the bucket below the filter into four substantially equal volumes.

2. The cleaning system of claim 1, wherein the system is configured such that particulate matter on a cleaning implement passes through the filter when the cleaning implement is placed in fluid within the bucket; wherein the baffles reduce the motion of the fluid in the bottom of the bucket; and wherein a portion of the particulate matter is retained in the bucket below the filter when the bucket insert is in use.

3. The cleaning system of claim 1, wherein the filter further comprises a grasping means for removing the bucket insert from the bucket.

4. The cleaning system of claim 1, wherein the crossbars on the upward facing side of the filter further include upwardly tapered edges, and wherein the tapered edges minimize the surface area of the filter.

5. The cleaning system of claim 1, wherein the shape of the filter substantially corresponds to the shape of the bucket.

6. A cleaning method, comprising:
   (a) providing an item to be cleaned, wherein the item to be cleaned further comprises removable particulate matter;
   (b) providing a cleaning implement for removing the particulate matter from the item;
   (c) providing a bucket for receiving the cleaning implement, wherein the bucket further comprises a closed bottom portion and an open top portion;
   (d) filling the bucket with a volume of cleaning fluid;
   (e) placing a removable insert into the bucket, wherein the bucket insert sits in the bottom portion of the bucket and further comprises:
      (i) a filter, wherein the filter is plate shaped and further comprises:
         a) an upward facing side and a downward facing side; and
         b) a plurality of intersecting crossbars, wherein the crossbars define a plurality of openings between the intersecting crossbars; and
      (ii) a support means elevating the filter above the bottom of the bucket and consisting of two baffles, each baffle resting on the bucket bottom portion and attached to or formed integrally with the downward facing side of the filter, the baffles substantially traversing the length and width of the filter at substantially right angles to the filter and dividing and separating the space in the bucket below the filter into four substantially equal volumes; and (f) using the cleaning implement to remove the particulate matter from the item;
   (g) rinsing the cleaning implement in the fluid; and
   (h) wherein the particulate matter passes through the filter when the cleaning implement is rinsed in the fluid; wherein the baffles reduce the motion of the fluid in the bottom of the bucket; and wherein a portion of the particulate matter is retained in the bucket below the filter.

7. The cleaning method of claim 6, wherein the item to be cleaned is a vehicle.

8. The cleaning method of claim 6, wherein the cleaning implement is at least one of a rag and a mitt.

9. The cleaning method of claim 6, wherein the filter further comprises a grasping means for removing the bucket insert from the bucket.

10. The cleaning method of claim 6, wherein the crossbars on the upward facing side of the filter further include upwardly tapered edges, and wherein the tapered edges minimize the surface area of the filter.

11. The cleaning method of claim 6, wherein the shape of the filter substantially corresponds to the shape of the bucket.

\* \* \* \* \*